Dec. 18, 1956 G. E. SORENSEN 2,774,145
CENTER SPACING TEST COMPARATOR AND METHOD
Filed May 11, 1953 5 Sheets-Sheet 1
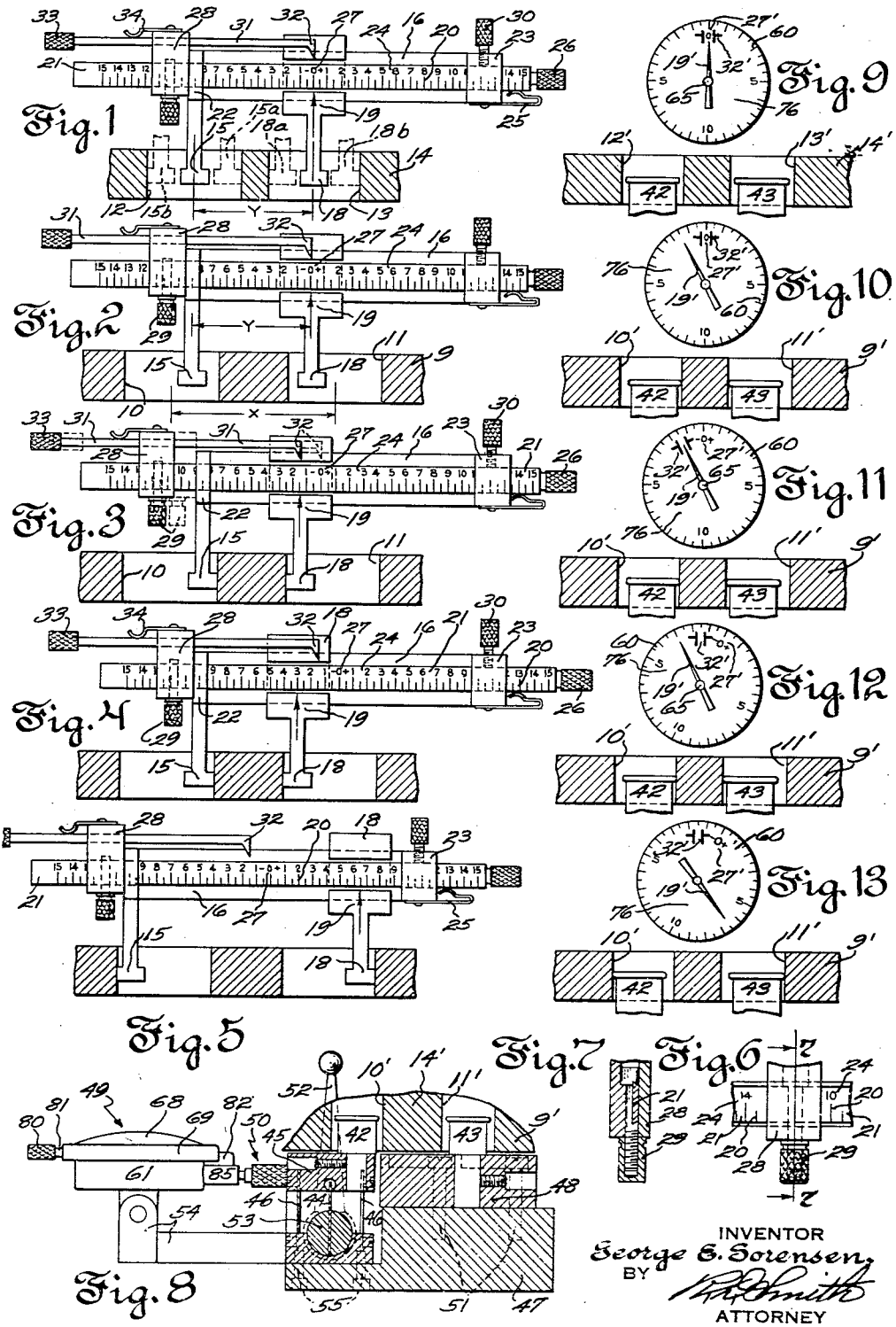
INVENTOR
George E. Sorensen
BY
ATTORNEY Dec. 18, 1956 G. E. SORENSEN 2,774,145
CENTER SPACING TEST COMPARATOR AND METHOD
Filed May 11, 1953 5 Sheets-Sheet 2

INVENTOR
George E. Sorensen,
BY
ATTORNEY

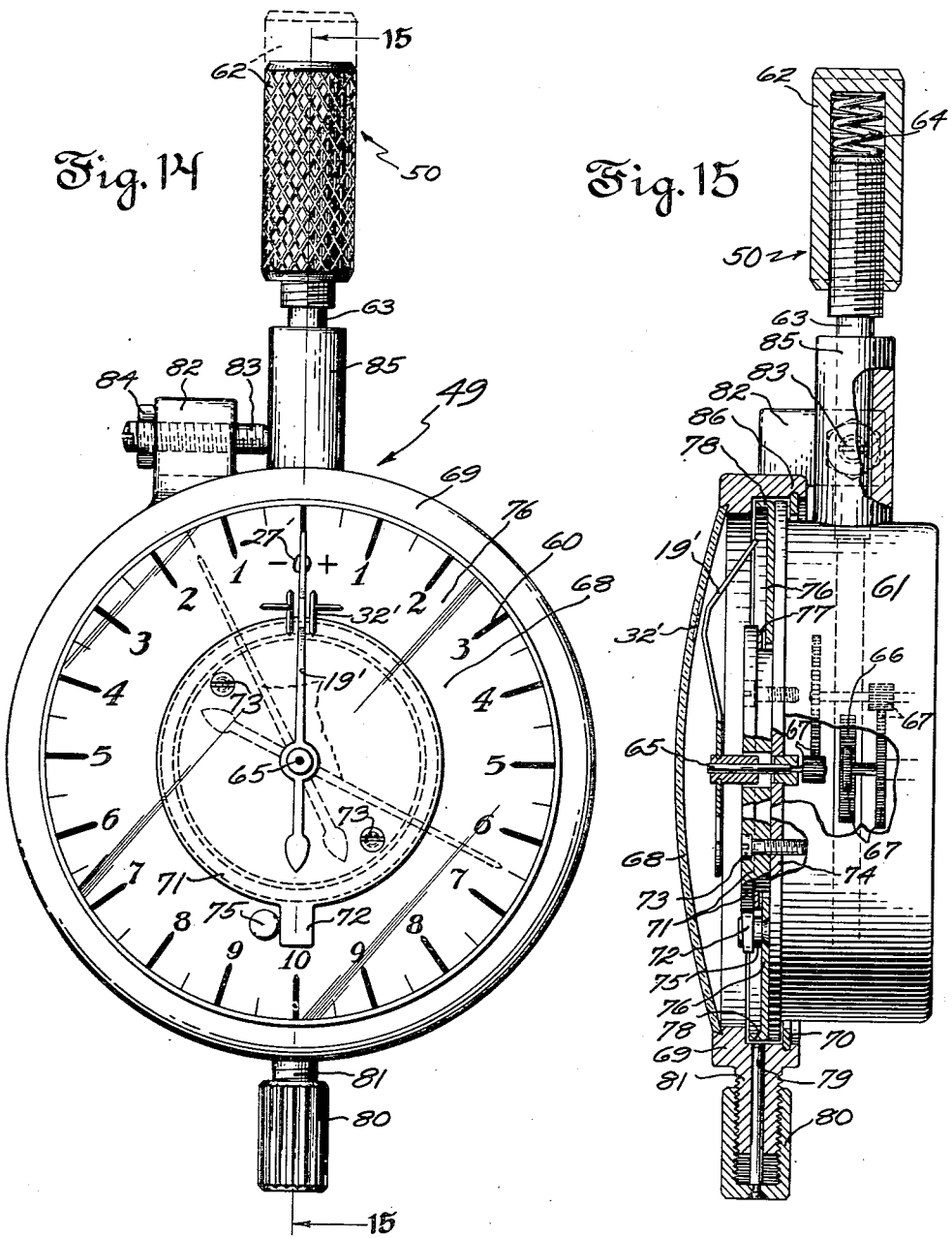

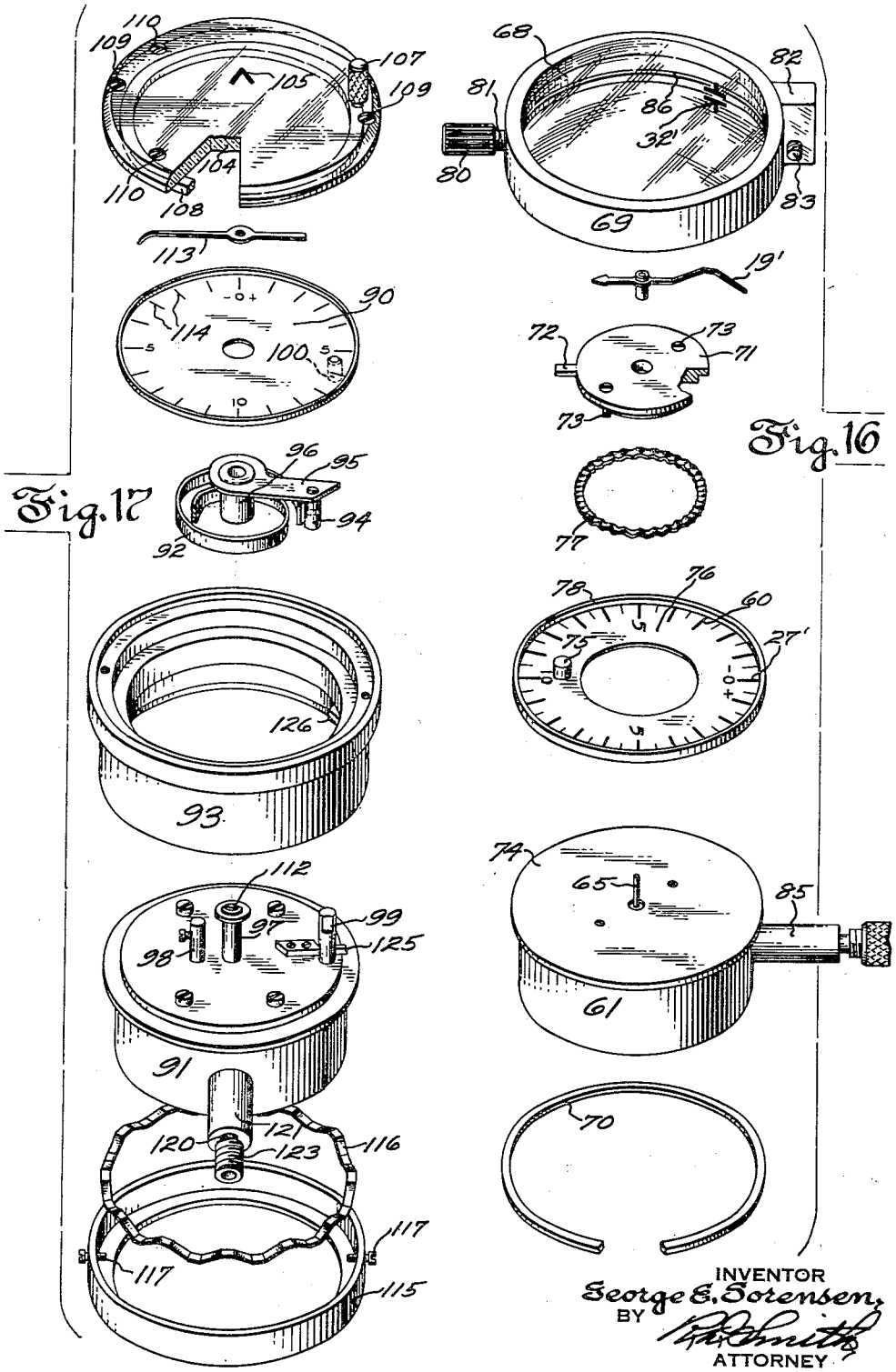

Dec. 18, 1956  G. E. SORENSEN  2,774,145
CENTER SPACING TEST COMPARATOR AND METHOD
Filed May 11, 1953  5 Sheets-Sheet 5
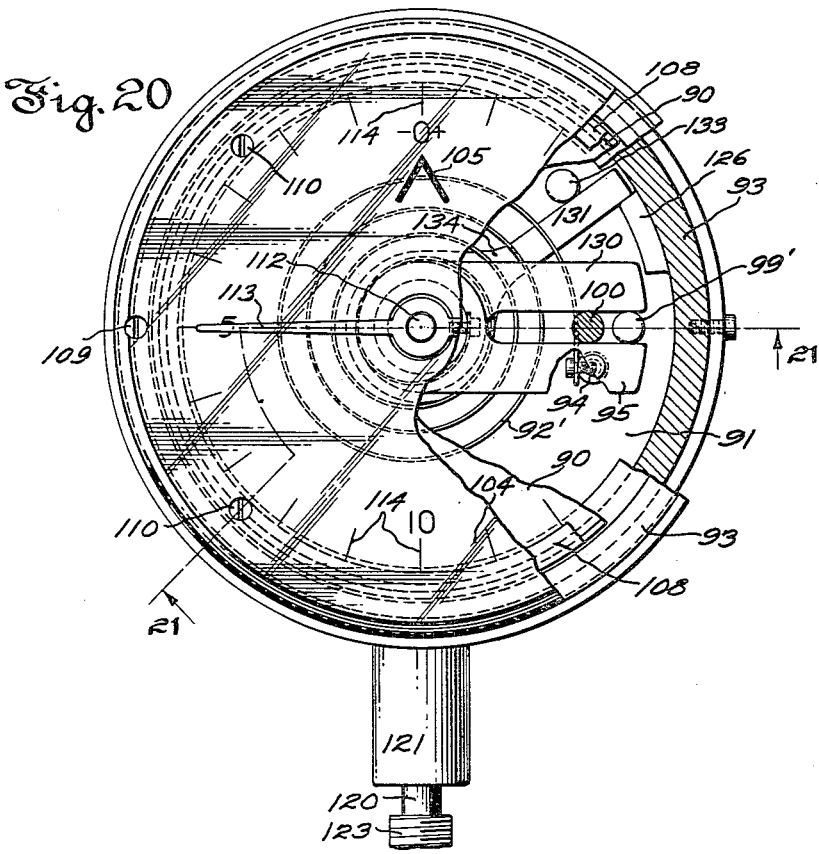
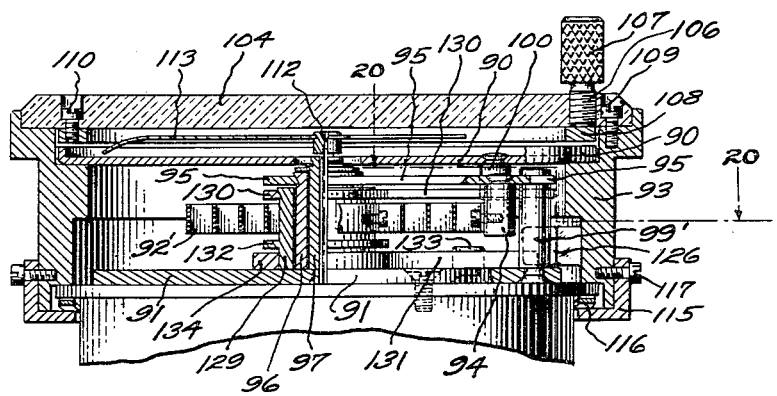
INVENTOR
George E. Sorensen
BY
ATTORNEY United States Patent Office 2,774,145
Patented Dec. 18, 1956

2,774,145

CENTER SPACING TEST COMPARATOR AND METHOD

George E. Sorensen, Fairfield, Conn.

Application May 11, 1953, Serial No. 354,131

19 Claims. (Cl. 33—147)

This invention relates to dimension testing instruments of the calipering kind and particularly of the accurately indicating over-and-under dial type, one example of which is disclosed in my U. S. Patent No. 2,388,582. In a broad aspect the present improvements concern methods of ascertaining the measure of error, or amount of departure from a standard, in unmeasurable distance between points in a work piece that cannot be directly calipered, such as the indiscernible centers of two round holes having parallel axes.

One object of the invention is to ascertain such error quantitatively by calipering only the hole boundaries. This object can be achieved through my improved method of testing by first calipering the boundaries of accurately spaced holes in a master gage and then calipering the boundaries of comparable holes in a work piece whose accuracy is to be tested. I have discovered how any departure from accuracy in center distance can be detected and determined quantitatively without resort to computation and without even knowing the actual sizes of the holes in the master gage or in the work piece or the size relationship of such holes.

A specific aim of the present improvement in method is to measure and correspondingly space off in a series of steps and on a specially denominated scale of graduations only those distances or components of distance that separate the boundaries of respectively different neighboring holes in a piece of work and thereby cause to be indicated on such scale the quantitative value of the plus or minus error that characterizes the actual spacing between the hole centers.

A further object of the invention is to provide dimension testing calipers with a specially arranged scale, which when utilized in accordance with my improved method, will give a direct reading of the "over" or "under" differential in dimension between an erroneous spacing of hole centers in a work piece and a correct spacing of comparable hole centers in a master gage regardless of errors in the diameters of the work holes or of the master holes.

A further object is to make such direct indication of center distance error readable on the instrument in terms of chosen units of measurement by merely observing the ultimate position of a single shiftable indicator such as an index mark or pointer in relation to a single scale of graduations that are denominated by specially chosen indicia, such ultimate indicating position of the pointer to result solely from a series of manually performed measuring operations performed on the work and spaced off manually or automatically on the scale.

A further object is to provide a calipering instrument of such construction that adjustive bodily shifting of the scale of graduations as a whole relatively to the body structure or framework of the instrument, and independently of calipering action of the instrument, performs mechanically an operation equivalent to computative subtraction or addition of quantitative values with respect to the reading of the pointer against the scale, thereby to serve as a substitute for arithmetical computation that theretofore has been required.

A further object is to accomplish such bodily shifting of the scale manually and accurately without reference to the graduations on the scale.

A related object is to equip the instrument with automatically acting means for restoring the scale to a normal position after it has been displaced manually therefrom for the foregoing purpose of avoiding computation.

These and related objects of the invention will appear in greater particular in the following description of illustrative ways and means for carrying out the present improvements with the aid of a wide variety of instruments contrasting greatly in complexity and convenience of use, such description having reference to the appended drawings wherein:

Figs. 1 to 5, inclusive, are partly diagrammatic views of a center distance comparing instrument embodying structural aspects of the invention showing the instrument parts variously related as in calipering a work piece according to my improved method.

Fig. 6 is an enlarged fragmentary view of a check carried on the graduated scale of the instrument in Figs. 1 to 5.

Fig. 7 is a view taken in section on the plane 7—7 in Fig. 6 looking in the direction of the arrows.

Fig. 8 shows partly in cross section a center distance comparing fixture supporting work whose dimensions are to be tested thereby. The fixture incorporates an over-and-under dial type of indicator head capable of use in accordance with the invention.

Figs. 9 to 13, inclusive, are diagrammatic representations of readings at the indicator head of Fig. 8 corresponding to various positions of the work calipering parts of the apparatus.

Fig. 14 is an enlarged plan view of the indicator head of Fig. 8.

Fig. 15 is an elevation taken partly in section on the plane 15—15 in Fig. 14.

Fig. 16 comprises perspective views of the parts of the indicator head of Fig. 15 shown in exploded relation.

Fig. 17 comprises comparable perspective views of the parts of a modified construction of indicator head shown in exploded relation.

Figure 18:
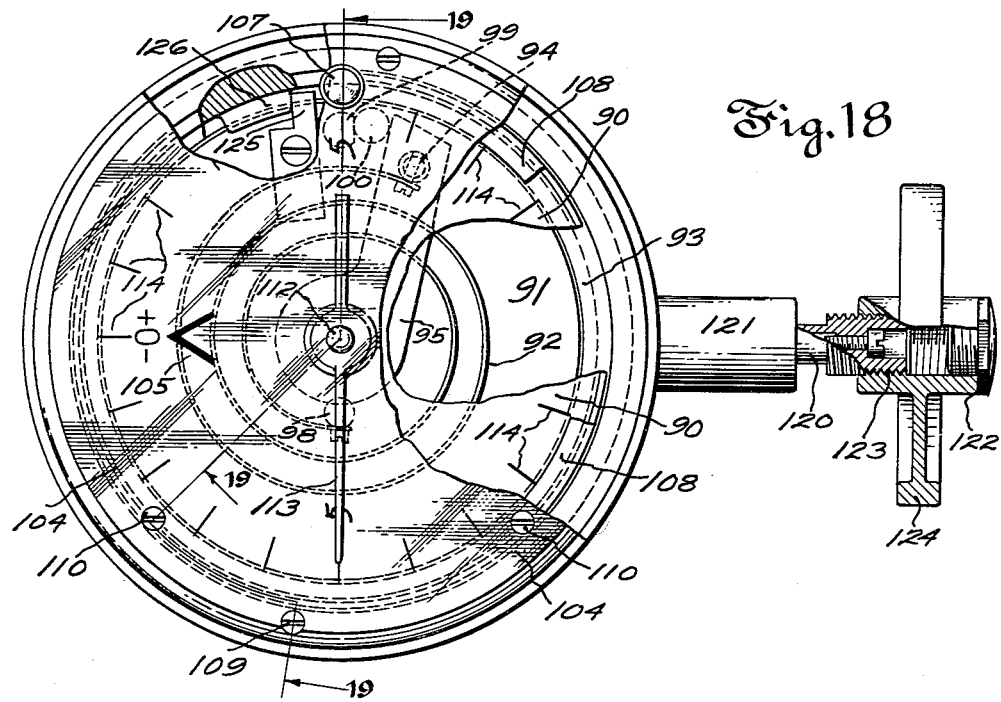

Fig. 18 is a partly broken away plan view of an indicator head composed of the parts shown in Fig. 17.

Figure 19:
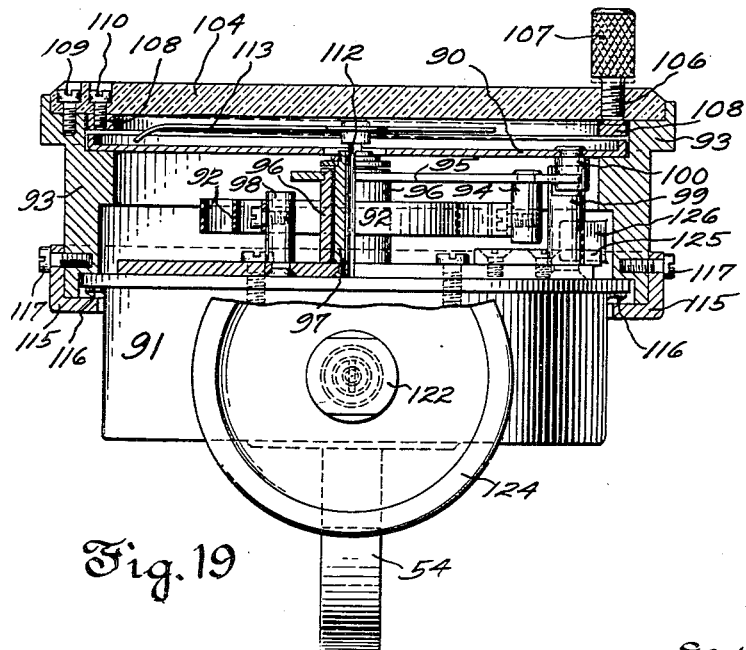

Fig. 19 is an elevation looking from the left at Fig. 18 showing parts of the structure in section on the radial planes 19—19—19 in Fig. 18.

Fig. 20 is a view like Fig. 18 showing the mechanism partially in section on planes 20—20 in Fig. 21 and modified to work in universal rotary directions.

Fig. 21 is a view taken in section on the planes 21—21 in Fig. 20 looking in the direction of the arrows.

Calipering instruments of widely differing types and constructions can be used as an aid in carrying out my improved method. For example the instrument may take the general form of a sliding beam calipers having some of the characteristics disclosed in my copending patent application, Serial No. 28,368, now U. S. Patent No. 2,700,825, but so modified as to make that type of instrument usable as an "over-and-under" dimension comparing instrument for the purpose of testing the accuracy of dimensions with respect to a standard, as distinguished from measuring the magnitude of a dimension. It is desired that the instrument be capable of giving a direct quantitative reading of a dimensional error. Or an entirely different style of instrument may be employed as an aid in carrying out the improved method such as an improved version of the extremely accurate over-and-under dial comparator disclosed in my aforesaid United States Patent No. 2,388,582.

There is represented diagrammatically in Figs. 1 to 5 a series of calipering and spacing off operations showing an example of various ways in which my improved method can be performed according to this invention so that the plus or minus amount of a dimensional error in a piece of work 9, such as an error in the distance separating the non caliperable centers of two neighboring holes 10 and 11, can be ascertained quantitatively without arithmetical computation and by calipering only those distances which separate boundary edges of the different holes.

To explain a typical series of such operations let it be assumed that the correct or standard dimension of distance between the centers of two round holes 12, 13 in a master gage 14 in Fig. 1 is Y. As the parts of my improved comparator there stand adjusted, this distance Y is also the distance between the median or vertical center line of a calipering leg 15 that comprises a fixed part of the frame beam 16 of the instrument and the median or vertical center line of a calipering leg 18 that is supported slidably on beam 16 and carries an indicator in the form of an index arrow 19 marked thereon.

As leg 18 slides along beam 16, index 19 sweeps along a scale of over-and-under graduations 20 denoted by indicia 24 carried on a slide 21. This slide is guided in frame bearings 22 and 23 fixed on the beam so as to be shiftable lengthwise relatively thereto against the constant frictional resistance of a leaf spring 25 mounted on the frame so as to be wiped by the bottom edge of the slide. A handle 26 on slide 21 affords convenience for finger grasp for bodily shifting the slide lengthwise in a manner to establish the zero mark 27 of the over-and-under scale 20 at any chosen position along the beam.

Slide 21 carries a check 28 that can be clamped into fixity with the slide or can be released for relative shifting movement along the slide by tightening or loosening a clutch screw 29 whose construction, as shown in detail in Figs. 6 and 7, may be like that of a similar check disclosed in my aforesaid Patent No. 2,700,825. Check 28 enables the user of the instrument to double, without reference to graduations on the scale, an increment of displacement between index 19 and slide 21 by shifting the latter bodily in relation to beam 16 while the index remains stationed in relation to the beam. Check 28 is made use of for this purpose during a series of calipering and spacing-off steps performed respectively on the work and on the scale and without having to count or observe the scale graduations. This is a step in my improved method that helps avoid certain arithmetical computations heretofore considered necessary in ascertaining center spacing errors by the use of merely a single indicator and a single scale of graduations.

For purposes peculiar to the use of beam calipers for measuring erroneous differences in dimensions, the check 28 as constructed herein is equipped with a signal rod 31 slidably mounted therein and carrying at its right extremity the marker 32. Rod 31 is adjustable lengthwise relatively to check 28 by means of its handle 33. A leaf spring 34 mounted on check 28 bears against the top edge of rod 31 and frictionally tends to maintain this rod yieldably in any set position relative to check 28. Marker 32 assists in making a compensative step-along shifting of the slide 21 along scale 20 in unison with check 28 that constitutes one of the spacing-off steps in my improved method referred to above.

There are, however, more elementary though less convenient ways in which such spacing-off steps can be performed with respect to the scale of graduations 20, such as by using the points of an ordinary machinist's dividers to gage measurements of work distance and transfer them to the scale 20. In this manner also there can be marked off on the scale without counting or observing graduations thereon the duplicate of any initial displacement of the index 19 from the zero mark on the scale shown to have taken place between the positions of these parts in Fig. 3 and Fig. 4.

In using the beam calipers of Figs. 1 to 7 as a comparator for testing the accuracy of center distance dimensions, an initially set working location or calibrated position for zero graduation 27 along the frame beam 16 is established by first calipering the master gage 14 and establishing the zero graduation 27 exactly midway the total range of travel performed by index 19 when caliper legs 15, 18 are shifted from their nearest together broken-line positions 15a, 18a in Fig. 1, where they are touching the nearest together sides of master holes 12, 13, to their farthest apart broken-line positions 15b, 18b where they are touching the farthest apart sides of the same master holes. The zero indicium 27 is shown in such initial setting in Fig. 1 and locked therein by pressure of thumb screw 30 against slide 21. The check 28 at this time should be locked on slide 21 and in abutment with frame bearing 22 and marker 32 should be in register with index 19.

Having thus first set the instrument in accordance with the master gage 14, it is ready to be used as an aid in carrying out my new method for testing a work piece so that there will result direct reading on the instrument of the amount of error, plus or minus, that characterizes the center spacing between the holes 10 and 11 in the work piece 9. The easily maneuverable type of instrument shown in Figs. 1 to 7, being very light in weight and small in size, can easily be taken to a heavy work piece 9 for testing the accuracy of the center spacing of any two holes such as 10 and 11 therein as compared with the accurate center distance Y of a known standard.

For more detailed explanation of the improved method, let the unknown, assumably erroneous, center spacing of the holes in the work piece be designated X. Let it also be assumed that the unknown value of X, in terms of Y, is Y units of indicia indicated standard measurement plus the indicium indicated error of 6½ units in the work measurement. The problem to be solved is how to obtain a direct reading of "plus 6½ units" on the single series of graduations on instrument scale 20 through the ultimate registration on such scale of a single indicator 19 with the scale graduation that is denominated "plus 6½" on the slide 21. As one means of carrying out this method Figs. 2 to 5, inclusive, show the instrument of Fig. 1 applied to work piece 9 in a series of calipering and spacing-off steps performed according to the invention.

When the legs 15, 18 as shown in Fig. 3 are moved closest together into calipering engagement with the nearest together sides of holes 10 and 11 index 19 becomes displaced toward the left away from zero mark 27, while the latter remains stationary in relation to frame 16, an extent equal to three of the graduations 20 on slide 21. For reasons that will later appear such scale graduation that is third removed from "zero" is designated by an indicium denoting half the quantitative value of "3", or "1½" units. In other words, and as distinguished from the scale markings in the instrument of my Patent 2,388,582, the indicia 24 herein denote only halves of the true extents of relative movements of the calipering legs or work sensing elements 15, 18.

Now while legs 15, 18 remain positioned as in Fig. 3, and with clutch screw 29 released, signal rod 31 and check 28 held together by friction spring 34 are manually shifted in unison toward the left along and relatively to slide 21 until marker 32 again registers with index 19 in its new or displaced position. This step requires no reference to nor reading of the scale graduations. Check 28 is now made fast to slide 21 by tightening clutch screw 29. Then thumbscrew 30 is loosened so that slide 21, in unison with check 28 now fixed thereon, can be manually shifted toward the right into the compensative position shown in Figs. 4 and 5. Thumb-screw 30 may now be retightened. Thus the check has been returned to its starting position abutting against beam bearing 22 which serves as its limit stop. The extent of separation of zero mark 27 from index 19 has thus been duplicated or exactly doubled without referring to any graduation on the scale 20. It could similarly have been doubled without use of the check 28 by spacing off with the points of a machinists' divider along the scale that graduation of initial displacement of maker 32 from zero shown in Fig. 3 and then shoving slide 21 toward the right in Fig. 4 an increment of movement equal to such initial displacement but this would be less convenient and more subject to manipulative error.

Legs 15, 18 are next moved apart until they touch the farthest apart sides of work holes 10, 11 as shown in Fig. 5, slide 21 meanwhile remaining stationed in relation to beam 16 by means of the locking thumbscrew 30. This brings index 19 into registration with the graduation on scale 20 that is denominated "plus 6½" units. Thus there comes about the direct reading, indicated by the single indicator 19 on the single scale of graduations 20, of the quantitative error of "plus 6½" which tells that the erroneous work center distance X is 6½ units of measurement greater than the standard master determined center spacing Y.

The advantage arising from my improved method become evident from comparison with such alternative procedures as are available for attaining the desired test result. Such alternatives would require computation as follows: As before we might start with index 19 in register with "zero" as in Figs. 1 and 2. Were it not for the half-value denominating indicia on scale 20, the reading that would be given by ordinary full-value indicia in Fig. 3 would be "minus 3" units when the nearest together sides of the holes are calipered. Likewise in the absence of half-value indicia and without the accompanying method step of doubling the extent of displacement of zero mark 27 from index 19, the ultimate reading of index 19 against the scale 20 would be "plus 16" units upon calipering the farthest apart sides of the holes. Such reading would be a useless and misinformative indication. Thus in the absence of this invention, the only useable indication that could be obtained on scale 20 by calipering the hole sides is the full extent of indicator movement occasioned by separating legs 15, 18 from their relation in Fig. 3 to their relation in Fig. 5. This might be "3" units plus "16" units or "19" units. From data thus obtained by calipering the work the following computation would need to be resorted to in order to find the error in center spacing, namely:

$$X-Y=\frac{3+16}{2}-3=6\frac{1}{2}$$

Had the work distance X happened to be exactly equal to the master distance Y the calipering indications and necessary calculation would be:

$$X-Y=\frac{9\frac{1}{2}+9\frac{1}{2}}{2}-9\frac{1}{2}=0$$

for it is only when the work center distance exactly equals the master center distance that the total movement of the index takes place to like extent on both the left, or "under" side, and the right, or "over" side, of zero on the scale.

In both of the above cases the total extent of movement of the instrument legs in calipering a piece of work would remain the same, namely "19" units of measurement.

In the foregoing examples of alternatives to the practice of this invention, the computation of dividing by "2" is required in the absence of this invention because we are concerned only with the positional relationship of an invisible center point that lies half way between the limits of movement of the index 19. By use of this invention the dividing by "2" is carried out by employing a half value calibrated scale.

The computation that consists of subtracting "3" units of measurement in the case of calipering the work, like that of subtracting "9½" units of measurement in the case of calipering the master gage, is required in the absence of this invention because the extreme limit of movement of the index mark in "minus" direction on the scale was not at zero but instead was at a point displaced "3" units to the left or minus side of zero. By use of the invention this subtraction of "3" units is performed without computation by doubling the extent of separation of the indicator from zero on the scale by moving the scale.

Thus both the half-value denoting indicia and the step of shifting slide 21 from its position in Fig. 3 to its position in Fig. 4 are seen to be factors that aid in eliminating the necessity for subtracting by computation the amount of initial displacement of the index 19 from scale zero in Fig. 3.

Whether my improved method is practiced with the aid of a half-value calibrated over-and-under scale that is incorporated in an instrument as in Figs. 1 to 5 or that is used with other means of spacing off distances thereon such as by transferring work dimensions to such scale by means of machinet's dividers, the method in general is seen to comprise measuring a first differential (or a component thereof) between a standard dimension Y and a distance that separates the nearest together sides of the holes in the work piece, such distance being increased or such differential being descreased, in order to arrive at said component, by a constant which should be one half the combined widths of the work sensing calipering legs; spacing off such first differential or component thereof from zero graduation 27 on the half dimension denominated scale; establishing an indicator, index pointer or the like, 19, at the position on the scale thus arrived at, for example the graduation denominated "1½"; doubling the distance of separation between said indicator 19 and zero graduation 27; measuring a second differential (or a component thereof) between the aforesaid standard dimension Y and a distance that separates the farthest apart sides of the holes in the work piece, such distance being decreased and such differential being decreased, if at all, by the aforesaid same constant; and then spacing off said second differential (or component thereof) from the indicator along the scale to arrive at the scale graduation denominated plus "6½".

Figs. 9 to 13, inclusive, correspond respectively to Figs. 1 to 5, in showing diagrammatically how the method above disclosed can be practiced with the aid of an over-and-under, dial type of calipering instrument that is capable of indicating much finer increments of error than that of Figs. 1 to 5. The construction of this dial type of instrument may take the form shown in Figs. 8, 14, 15 and 16. Parts of an apparatus somewhat similar to that of Fig. 8 are shown in fuller detail in my aforesaid Patent No. 2,388,582.

It will suffice to explain here that the instrument of Fig. 8 incorporates two upstanding work sensing feelers 42 and 43 that are adapted for calipering engagement with the side walls of master holes 12' and 13' for setting the instrument to a standard, and on other occasions with the side walls of work holes 10' and 11' that are to be tested as to the accuracy of their center spacing in comparison with such standard in much the same manner as center spacing is tested by the instrument legs 15 and 18 in Figs. 1 to 5. Feeler 43 is removably held in a bed block 48 that is slidably adjustable left and right in Fig. 8 on the apparatus base 47, and is held in set positions by clamping screws 51. Feeler 42 is supported for lateral floating movement left and right in Fig. 8 on the top ends of four upstanding flexible leaf springs 46 whose bottom ends are fixedly anchored in the bracket 54 that is removably fastened on base 47 by holding screws 55. Thus as the tops of leaf springs 26 sway left or right in Fig. 8, feelers 42 and 43 may be brought into calipering engagement with one or the other sides of holes 10' and 11'. Leaf springs 46 flex in response to manual shifting of feeler supporting block 45 toward the right or toward the left in Fig. 8 by means of the swinging movement of an upstanding resilient actuating blade 44 whose bottom end is lodged in a rocker shaft 53 journaled in the bracket 54 and turnable by swinging an upstanding handle 52 fixed to the rocker shaft.

An outboard extension of bracket 54 supports the indicator head 49 whose sensing plunger 50 projects toward the right into abutting contact with the floating block 45. The indicator head 49 contains mechanism comprising the working parts of a dial type of over-and-under precision indicator which is disclosed in detail in Figs. 14 to 16, inclusive, of the drawings.

There is a circular scale of graduations 60 carried on a cupped dial 76 in indicator head 49 that may be compared with the scale 20 on slide 21 of Figs. 1 to 5 in at least the following respect. The scale includes a zero mark 27' from which the graduations 60 extend both clockwise and counterclockwise being denominated in each direction by indicia of increasing magnitude designated as "plus" in their clockwise progression and "minus" in their counterclockwise progression. Also, as in the case of the scale 20 in Figs. 1 through 5, the indicia of graduations 60 are calibrated to denote halves of the true extents of relative movement that take place between feelers 42 and 43 in the method steps of calipering the work. Further in Figs. 9 to 13 there is shown a marker 32' that corresponds with marker 32 in Figs. 1 to 5 except that in Figs. 13 to 15 this marker takes the form of a small gap between "hair lines" indented in a crystal 68 of the indicator head 49. Crystal 68 may be of glass or of any suitable transparent plastic material and is fixed in a bezel ring 69.

A transmission mechanism which may be of conventional nature operatively relates sensing plunger 50 to the pointer 19'. Through the action of rack teeth 66 carried on the sliding stem 63 of plunger 50 which are in mesh with a train of movement multiplying gears 67 driving the pointer spindle 65, very small increments of sliding movement of the plunger will cause a greatly magnified extent of indicating movement of the swingable pointer 19' in conventional manner.

A plan view of the indicator head of Fig. 8 is shown on a scale larger than actual size in Fig. 14. The parts and structure of its interior are shown in Figs. 15 and 16. Casing 61 affords a slide bearing 85 for the sensing plunger 50. The latter comprises a contact cup 62 adjustably threaded onto the plunger terminal 63. Confined therebetween is an axially expansive spring coil 64 which affords friction tending to resist accidental disturbance of the rotary setting of cup 62 on the screw threads of the plunger terminal.

The single indicator here employed is a rotary pointer 19' that may serve the same purpose as index 19 in Figs. 1 to 5. Pointer 19' is carried on a central rotary spindle 65 and is housed and protected within the face chamber of the instrument covered by the aforesaid transparent crystal 68. Bezel ring 69 is removably retained in swiveling relation on the rim of casing 61 by a split retaining washer 70 that is expanded radially for removably lodging it in a circumferential groove 86 in the bezel ring 69.

Within the face chamber of the instrument between crystal 68 and the dial supporting wall of casing 61 there is removably fixed on the casing by screws 73 a buttress disc 71 in island disposition having the radially projecting stop lug 72 that is encountered by a stop stud 75 upstanding fixedly from dial 76. The overhanging annular flange of buttress disc 71 retains between itself and casing 61 the aforesaid dial 76 carrying the scale of graduations 60. Such dial is a cupped annulus which has radial clearance about buttress disc 71 and which is maintained in concentric relation to pointer spindle 65 because its peripheral cup rim 78 is journaled within the bezel ring 69. Dial 76 is frictionally pressed axially against the casing wall 74 by a friction washer 77 of thin resilient crimped metal that intervenes between the overhanging flange of disc 71 and the dial.

Against the peripheral upstanding rim 78 of dial 76 there can lockingly be pressed the inner end of a clutch pin 79 whose outer end is fixed in a hollow knurled thumb nut 80 threading onto a boss 81 that projects radially from bezel ring 69 with which it is integral. Thus on occasion this bezel ring and the dial 76 can be clutched lockingly together to be turned manually in unison. Bezel ring 69 carries another external lug 82 in which is threaded an adjustable stop screw 83 that is fastened in its adjusted positions by the lock nut 84. One end of screw 83 abuts against the slide bearing 85 of casing 61 which limits its swiveling movement in clockwise direction to the position shown in Fig. 14.

In the use of the apparatus of Fig. 8 incorporating the indicator head disclosed in Figs. 8 to 16, inclusive, as an aid in carrying out my improved method of testing work pieces to determine the extent of variation of a work center spacing X from a master or standard center spacing Y, so designated in Figs. 1 to 5, it will first be seen that bezel ring 69 is turned clockwise so that its stop screw 83 abuts against bearing 85, and it will be seen that the stop stud 75 in dial 76, through use of clutch pin 79 and bezel ring 69, is turned counterclockwise so as to abut against the stop lug 72. These positions of parts are shown in Fig. 14.

The master gage 14 is first placed on the instrument base 47 with feelers 42, 43 occupying master holes 12' and 13', and the bed block 48 may then be adjusted horizontally with respect to the base 47 and master holes 12', 13' until indicator pointer 19' swings approximately equal distances on opposite sides of the "zero" graduation on scale 60 in response to reciprocative swinging movements of the handle 52 clockwise and counterclockwise from its normal upright position shown in Fig. 8. After a rough trial and an approximate setting of the block 48 the latter is secured fixedly to base 47 by tightening its clamping screws 51. Thereupon finer accuracy of adjustment in centralizing the position of the zero graduation in relation to the overall range of swing of pointer 19' is obtained by turning the sensing plunger 50 by means of its thumb piece 62. In this way the sensing plunger 50 is so adjusted that pointer 19' swings away from zero exactly the same number of divisions on scale 20' to each side of zero when handle 52 is swung full extents of movement in opposite directions. Thus when the pointer 19' is at zero on the scale the centers, or medians of width, of the feelers 42 and 43 will be a distance apart exactly equal to the master spacing.

With the instrument thus accurately adjusted to determine a standard, a work piece 9' may be inspected according to this invention by substituting it for the master gage 14' in order to find quantitatively the deviation of the center spacing X of work holes 10', 11' from the standard center spacing Y of corresponding master holes 12', 13'. The work piece 9' is first placed on the instrument with its holes loosely occupied by the feelers 42, 43 but so that the side wall of hole 11' will contact with feeler 43 as shown in Fig. 10. Then handle 52 is swung clockwise in Fig. 8 which moves the floating block 45 and its carried feeler 42 to the right toward the stationary feeler 43 so that feelers 42, 43 are now positioned in respective calipering engagement with the nearest together sides of the work holes 10', 11', as shown in Fig. 10. This will result in a displacement of pointer 19' counterclockwise to the graduation denominated "1½" units of measurement, which may be thousandths of an inch, in Fig. 10. The calibration of the instrument is such that this movement of pointer 19' results from a relative closing together extent of movement of the feelers 42, 43 equal to .003". This constitutes what is referred to herein as a half value denominating of the scale graduations by the readable indicia employed.

The bezel ring 69, carrying with it the crystal 68, and while its clutch pin 79 remains loosened, is now manually swung counterclockwise to bring the marker 32' into register with the displaced position of pointer 19' as shown in Fig. 11. No rotary movement of dial 76 has been occasioned by thus turning bezel ring 69 because the dial remains stationed in relation to casing 61 because of the friction washer 77. When the marker 32' is positioned as in Fig. 11, thumb nut 80 is manually tightened which clamps the dial 76 in fixed relation to bezel ring 69. The bezel ring carrying the dial 76 with it is then manually returned clockwise to its initial position where it is arrested by the abutting of stop screw 83 against bearing 85 with the dial in the position shown in Fig. 12. This comprises a spacing off step of the improved method that has exactly doubled the degree of separation of indicator 19' from the zero graduation on the scale without necessity of observing or counting the graduations on the scale.

In the next and final step of the method the work piece 9' is shifted relatively to base 47 of the testing apparatus so that the opposite side of hole 11' contacts with feeler 43 as shown in Fig. 13. Handle 52, which up to this point has been held to the limit of its clockwise throw in Fig. 8, is now manually swung in the reverse or counterclockwise direction. This moves the floating block 45 and its carried feeler 42 toward the left away from stationary feeler 43 so that feelers 42, 43 become positioned in calipering engagement with the farthest apart sides of the work holes 10', 11' as shown in Fig. 13. This results in movement of pointer 19' clockwise to the graduation denominated "6½" units of measurement, or thousandths of an inch, as shown in Fig. 13. From the foregoing explanation of method this will be recognized to be the desired direct reading of the measure of error in center spacing of the work holes 12' and 13'.

In comparing Fig. 9 with Fig. 1 and Fig. 10 with Fig. 3 and Fig. 11 with Fig. 4 and Fig. 13 with Fig. 5, it will be seen that the same method of work measurement is accompanied by corresponding spacing off of increments of distance on a half value graduated scale with the aid of widely differing apparatus which in each case however requires no more than a single indicator and single scale of graduations supplemented for convenience by a manually shiftable marker as a convenient aid in transferring to the scale a duplicate of one increment of movement of the indicator relative thereto.

Figs. 17 through 19 show a modified construction of the mechanism in Figs. 14, 15 and 16 wherein there is added resilient means to return the dial 90 automatically to its normal stop determined position for performing a new measuring sequence, in place of having to return it manually after having accomplished the step of the method that doubles the distance separating the indicator from zero on the scale. In this modified construction the depth of the space between the scale carrying dial 90 and the nearest surface of frame casing 91 is increased to afford room for adding a return spring 92 for the dial 90. The buttress disc 71 of Fig. 15 is omitted. Spring 92 is of the spiral band type having its outer end anchored to a stud 94 that fixedly depends from an arm 95 whose hub 96 turns as a freely rotatable sleeve on the upstanding stationary central bearing post 97 that is rigid with frame casing 91. The inner end of spring 92 is attached to a stationary anchor post 98 that also is rigid with frame casing 91.

A movement limiting stud 100 depends fixedly from the bottom surface of dial 90 and rides therewith in a path to encounter a stationary stop post 99 that is rigid with frame casing 91. Stud 100 intervenes between stop post 99 and the free end of arm 95. Thus dial 90 is normally positioned in a predetermined location on the circle by the return spring 92 which yieldably urges the arm 95 and thereby the graduated dial 90 counterclockwise in Fig. 18.

As in Fig. 14 the crystal 104 is fastened in bezel ring 93 by screws 109 and may be a piece of glass or transparent plastic carrying the marker 105 here shown in the form of a V or arrow head.

Crystal 104 is penetrated by the shank of a clutch screw 106 in threaded engagement therewith and whose thumb piece 107 serves as an external handle capable of turning clutch screw 106 so that its inner end clamps downward against the flexible segmental portion of resilient clutch ring 108 that is attached in the anchored portion of its annular extent to the crystal 104 by two screws 110.

The spindle 112 of pointer 113 is journaled in the aforesaid hollow bearing post 97 so that pointer 113 sweeps over the graduations 114 on dial 90 between crystal 104 and the dial 90. The bezel ring 93 is retained in swiveling position on frame case 91 by a detachable thrust ring 115 between which and a flange on the frame casing there is a crimped friction washer 116 that exerts enough resistance to the turning of bezel 93 relatively to the frame casing to prevent the pull of spiral spring 92 from causing such relative movement. Removable screws 117 fasten ring 115 in place.

Within the casing 91 there is the same movement multiplying transmission gearing 66, 67 etc. as in the all-manually operated dial head casing 61 of Fig. 15 whereby minute increments of longitudinal movement of the stem 120 of a sensing plunger in its slide bearing 121 on the casing 91 cause greatly magnified extents of rotary movements of pointer 113. Sensing plunger 120 is equipped with a terminal head 122 that has threaded engagement at 123 with the plunger stem 120 so that by turning hand wheel 124 the sensing plunger can in effect be lengthened or shortened for purposes like those explained with respect to the sensing plunger 50 in Figs. 8, 14 and 15.

As an aid during use of the instrument in locating bezel ring 93 at a predetermined starting position on the circle in respect to frame casing 91 by a sense of "feel" without the need of placement by sight observation, the casing has fixed on it a radially outward projecting stop lug 125 that is encountered by a radially inward projecting stop lug 126 on bezel ring 93. Stop lug 126 thus serves the purpose of stop screw 83 in Figs. 14 and 15.

The operation of the dial head of Figs. 17, 18 and 19 is like that of the dial head of Figs. 14, 15 and 16 except that when the dial 90 is turned clockwise to shift the position of zero graduation on the dial scale in a clockwise direction as in Fig. 12, this is done against the yielding resistance of spring 92. Therefore upon release of the dial from retention by clutch screw 106 spring 92 acts to snap the dial instantly clockwise and back to its normal station so that the zero graduation again becomes automatically positioned as in Figs. 9, 10 and 11 ready for the next use of the instrument.

It will be observed that in its operating characteristics above explained the mechanism of Figs. 17, 18 and 19 is adapted to perform first a calipering operation that will swing pointer 113 counterclockwise in Fig. 18, or to the minus side of the zero graduation 114, wherefore the bezel ring 93 must be correspondingly swiveled counterclockwise to enable the marker 105 to "find" or be lined up with the displaced pointer. But if the first work calipering operation were such that pointer 113 becomes swung clockwise or to the plus side of the zero graduation, instead of counterclockwise, the marker 105 could not correspondingly be shifted clockwise from its own starting position to "find" the displaced pointer. This is because bezel ring lug 126 is prohibited from passing frame stop 125 in clockwise direction. I therefore have devised a remedy for such limitation in the sequence imposed on the two work calipering steps whereby they may be performed in any sequence.

Such freedom from restriction to a prescribed sequence of calipering steps characterizes the mechanism shown in Figs. 20 and 21 which may be like that in Figs. 17, 18 and 19 except in the following respects.

In Figs. 20 and 21 the outer end of return spring 92' is anchored to stud 94 depending from the revolvable free end of the arm 95 whose hub 96 is freely rotatable on stationary bearing post 97 as before. But the inner end of spring 92′, instead of being attached to a frame post, is attached to the hub 129 of a second freely swingable arm 130. Hub 129 is sleeved about hub 96 and free for rotation relative thereto wherefore arms 95 and 130 are swingable about the same center independently of each other. Spring 92′ constantly biases arm 95 counterclockwise into a normal stopped position against a stationary frame post 99′, which may be regarded as the equivalent for post 99 in Figs. 17, 18 and 19, and also biases arm 130 clockwise into a normal stopped position against the same frame post 99′. Thus post 99′ is straddled by arms 95 and 130 in their normal positions. Likewise straddled by these arms is the stud 100 that depends fixedly from dial 90 so that stud 100 not only can push arm 95 ahead of itself clockwise against the yielding resistance of spring 92′ as in 19, but stud 100 alternately can push arm 130 ahead of itself counterclockwise against the yielding resistance of the same spring 92′. Thus whenever displaced from starting position and released from the grab of clutch ring 108, the dial 90, by actuation of its stud 100, will automatically be snapped back instantly to its starting position shown in Fig. 20 from either direction of displacement therefrom.

Further for enabling bezel ring 93 to be free for departure from a starting position in either rotary direction in order to revolve marker 105 to "find" or line up with pointer 113, which now may be "found" on either the plus or minus side of the zero graduation, the immovable frame carried stop lug 125 of Figs. 18 and 19 is replaced by a flip stop. This may consist of a simple straight radial arm 131 having a hub portion 134 loosely swiveled about the hub 129 so as to swing a limited degree while confined between the flat surface of frame casing 91 and an annular guard flange 132 on hub 129.

As shown in Fig. 20 the degree of swing permitted to flip stop 131 is limited by its abutment against frame post 99′ in clockwise direction and by its abutment against a second stationary frame post 133 in counterclockwise direction. The internal lug 126 on bezel ring 93 has a segmental extent exactly equal to the degree of swing permitted to flip stop 131 wherefore starting from its position in Fig. 20, wherein marker 105 cannot be displaced by counterclockwise swiveling of bezel ring 93, the marker nevertheless can be turned in unison with the bezel ring one exact full revolution of 360 degrees, but not more, in a clockwise direction. This will bring marker 105 to the same position on the circle from which it started but with freedom now to be displaced counterclockwise for "finding" or being aligned with the first displaced position of pointer 113 at the end of the first work calipering step.

Thus regardless of whether the pointer shall be "found" on the minus side or the plus side of zero graduation on the scale, bezel ring 93 in Figs. 20 and 21 is capable of being manipulated so as to depart from its stop determined position in either rotary direction for aligning marker 105 with the pointer 113, after which the dial 90 will be clutched by ring 108 and swung back in unison with bezel ring 93 against the resistance of spring 92 in either direction until the bezel ring becomes arrested at its said stop determined position. This will have moved the dial an angular distance in either direction equal to the angular displacement of pointer 113 from zero by the first of the two calipering steps thus to perform the compensative or corrective spacing off step of my improved method heretofore explained. Immediately upon release of dial 90 from the hold of clutch ring 108 spring 92′ will actuate stud 94 to snap the dial around in either direction thus automatically returning it to its normal starting position shown in Fig. 20.

In making use of the instrument of Figs. 20 and 21 on the specific work piece 9′ for determining the assumed center spacing error of 6½ units of measurement by direct reading of this quantitative value on the graduations 114 of the dial 90, it becomes possible first to caliper the farthest apart sides of holes 10′ and 11′ and last to caliper the nearest together sides of the holes in the following way of practising my improved method.

The handle 52 first is swung counterclockwise in Fig. 8. This moves the floating block 45 and its carried feeler 42 to the left away from the stationary feeler 43 so that feelers 42, 43 become positioned in calipering engagement respectively with the farthest apart sides of the work holes 10′, 11′. This will result in a displacement of pointer 113 clockwise from zero graduation on dial 90 to the graduation denominated 8 units of measurement.

The bezel ring 93 carrying with it the crystal 104, and while its clutch ring 108 is positioned as in Fig. 21 to free dial 90, is now manually swung clockwise to bring the crystal carried marker 105 into register with the displaced position of pointer 113, the dial meanwhile remaining stationed by the imprisonment of its stud 100 between the arms 95 and 130 which are biased in respectively opposite directions against the frame post 99′.

When marker 105 is thus manually brought into alignment with pointer 113 clutch ring 108 is to be clamped down against the upturned rim of dial 90 by tightening the thumbscrew 106 thus coupling the dial and bezel ring 93 fixedly together so that when the latter is manually returned counterclockwise to its initial position, where it is arrested by flip stop 131, there will be carried in unison with it the dial 90 against the yielding resistance of its return spring 92′. This comprises the spacing-off step of my improved method and will have exactly doubled the degree of separation between pointer 113 and the zero graduation without necessity of observing or counting any graduations on the scale.

In the next and final step of the method, the work piece 9′ is shifted relatively to base 47 of the testing apparatus so that the opposite side of hole 11′ contacts with feeler 43. Handle 52, which up to this point has been held to the limit of its counterclockwise throw in Fig. 8, is now manually swung in the reverse or clockwise direction. This moves the floating block 45 and its carried feeler 42 to the right toward stationary feeler 43 so that feelers 42, 43 become positioned in calipering engagement with the nearest together sides of the work holes 10′, 11′. This results in movement of pointer 113 counterclockwise to the graduation denominated "6½" units of measurement, the desired result.

There have been disclosed herein several ways of practising my present improvements in method as well as widely different varieties of instruments that may be made use of as an aid in practising the invention in method and that embody as well certain physical features of the invention in their principles of construction, wherefore the appended claims are directed to and intended to cover all of such ways of practising the method and all such principles of construction, as well as all obvious substitutes therefor, that come within the broadest fair interpretation of the recital of the claims.

I claim:

1. The method of ascertaining the measure of error between an unmeasurable spacing of hole centers in a work piece and a standard dimension with which said center spacing if accurate should accord, which includes the steps of, measuring at least a component of a first differential between said standard dimension and the distance separating two sides respectviely of said holes, spacing off said component from a zero graduation on a half-value denominated over-and-under scale, positioning an indicator at the point on said scale arrived at by said spacing off step, doubling the distance of separation of said indicator and said zero graduation along said scale, measuring at least a component of a second differential between the distance that separates a different two sides respectively of said holes and said standard dimension, and spacing off said component of said second differential from said indicator along said scale in the direction of said zero graduation wherefore to arrive on said scale at a point quantitatively denoting said measure of error.

2. The method of ascertaining the measure of error between an unmeasurable spacing of hole centers in a work piece and a standard dimension with which said center spacing if accurate should accord, which includes the steps of, measuring a first differential between said standard dimension and the distance separating two sides respectively of said holes while simultaneously reducing said first differential by a constant, spacing off said reduced first differential from a zero graduation on a half-value denominated over-and-under scale, positioning an indicator at the point of said scale arrived at by said spacing off step, doubling the distance of separation of said indicator and said zero graduation along said scale, measuring a second differential between the distance that separates a different two sides respectively of said holes and said standard dimension while simultaneously reducing said second differential by said constant, and spacing off said second differential from said indicator along said scale in the direction of said zero graduation wherefore to arrive on said scale at a point quantitatively denoting said measure of error.

3. The method of ascertaining the measure of error between an unmeasurable spacing of hole centers in a work piece and a standard dimension with which said center spacing if accurate should accord, which includes the steps of, measuring with the aid of work calipering feelers having a definite combined width a first differential between said standard dimension and the distance separating two sides respectively of said holes while simultaneously reducing said first differential by a constant equal to half of second combined width of said feelers, spacing off said reduced first differential from a zero graduation on a half-value denominated over-and-under scale, positioning an indicator at the point of said scale arrived at by said spacing off step, doubling the distance of separation of said indicator and said zero graduation along said scale, measuring a second differential between the distance that separates a different two sides respectively of said holes and said standard dimension while simultaneously reducing said second differential by said constant, and spacing off said reduced second differential from said indicator along said scale in the direction of said zero graduation wherefore to arrive on said scale at a point quantitatively denoting said measure of error.

4. The method of ascertaining the measure of error between an unmeasurable spacing of hole centers in a work piece and a standard dimension with which said center spacing if accurate should accord, which includes the steps of, measuring at least a component of a first differential between said standard dimension and the distance separating the nearest together sides of said holes, spacing off said component from a zero graduation on a half-value denominated over-and-under scale, positioning an indicator at the point on said scale arrived at by said spacing off step, doubling the distance of separation of said indicator and said zero graduation along said scale, measuring at least a component of a second differential between the distance that separates the farthest apart sides of said holes and said standard dimension, spacing off said component of said second differential from said indicator along said scale in the direction of said zero graduation wherefore to arrive on said scale at a point quantitatively denoting said measure of error.

5. The method of ascertaining the measure of error between an unmeasurable spacing of hole centers in a work piece and a standard dimension with which said center spacing if accurate should accord, which includes the steps of, measuring at least a component of a first differential between said standard dimension and the distance separating the farthest apart sides of said holes, spacing off said component from a zero graduation on a half-value denominated over-and-under scale, positioning an indicator at the point on said scale arrived at by said spacing off step, doubling the distance of separation of said indicator and said zero graduation along said scale, measuring at least a component of a second differential between the distance that separates the nearest together sides of said holes and said standard dimension, spacing off said component of said second differential from said indicator along said scale in the direction of said zero graduation wherefore to arrive on said scale at a point quantitatively denoting said measure of error.

6. An instrument for comparing work center spacing with a standard dimension, embodying in combination, frame structure, a first work sensing feeler fixed on said frame structure, a second work sensing feeler carried by said frame structure in movable relation to said first feeler, an over-and-under scale carried by said frame in rotatably shiftable relation thereto and to said second feeler including a series of graduations extending in part in respectively opposite directions from a zero graduation on said scale, indicia on said scale respectively denominating said graduations as units of measurement progressively aggregated in each of said directions, an indicator carried by said frame structure in movable relation thereto and to said scale, connections between said indicator and said second feeler operative to transmit motion from the latter to the former in such ratio that said indicator performs increments of movement denoted on said scale by said indicia to be one half the true extent of corresponding increments of relative movement between said feelers, said connections including a motion transmitting coupling variable in dimension in a manner to alter simultaneous relative positions of said indicator and said second feeler, a marker operatively associated with said scale in a manner to be movable in unison with the shifting of said scale and also relatively to said scale, and means to shift said scale relatively to said frame structure and to said indicator independently of relative movement between said feelers.

7. An instrument for comparing work center spacing with a standard dimension as defined in claim 6, together with a device carrying the said marker adjustable along said scale to move said marker into and away from registration with the said zero graduation on said scale and into and away from registration with the said indicator when the latter is displaced from said zero graduation and means to determine a fixed normal position of said device relative to the said frame structure independently of said scale and said indicator.

8. An instrument for comparing work center spacing with a standard dimension as defined in claim 7, together with mutually engageable stop means in part on the said marker carrying device and in part on the said frame structure of the instrument limiting adjustive return movement of said device to its normal starting position.

9. An instrument for comparing work center spacing with a standard dimension as defined in claim 7, together with clutch means operative releasably to couple said scale and the said marker carrying device fixedly together in selective relationship.

10. An instrument for comparing work center spacing with a standard dimension as defined in claim 9, together with scale staying means normally operative yieldingly to oppose change of position of said scale in relation to the said frame structure.

11. An instrument for comparing work center spacing with a standard dimension as defined in claim 6, together with cooperative stop means in part on the said scale and in part on the said frame structure arranged to limit movement of said scale to a predetermined position in relation to said framework.

12. An instrument for comparing work center spacing with a standard dimension as defined in claim 11, together with resilient means arranged yieldingly to urge the said scale into its said predetermined position.

13. An instrument for comparing work center spacing with a standard dimension as defined in claim 12, together with a friction producing device acting between the said means to shift said scale and the said frame structure with sufficient resistive force to prevent said means from being turned relatively to said frame structure responsively to the urging of the said resilient means.

14. An instrument for comparing work center spacing with a standard dimension as defined in claim 11, together with resilient means arranged yieldingly to urge the said scale into its said predetermined position from either rotary direction of approach.

15. An instrument for comparing work center spacing with a standard dimension as defined in claim 14, together with a friction producing device acting between the said means to shift said scale and the said frame structure with sufficient resistive force to prevent said means from being turned relatively to said frame structure responsively to the urging of the said resilient means.

16. An instrument for comparing work center spacing with a standard dimension as defined in claim 14, together with a device carrying the said marker adjustable along the said scale to move said marker into and away from registration with the said zero graduation on said scale and into and away from registration with the said indicator when the latter is displaced from said zero graduation, and mutually engageable stop means in part on the said marker carrying device and in part on the said frame structure of the instrument limiting adjustive return movement of said device from either direction of approach to the same predetermined starting position, said part of said stop means on the frame structure comprising a flip stop accommodating a full 360 degrees rotary turning of said marker carrying device in either rotary direction.

17. An instrument for comparing work center spacing with a standard dimension as defined in claim 6, together with a device carrying the said marker adjustable along the said scale to move said marker into and away from registration with the said zero graduation on said scale and into and away from registration with the said indicator when the latter is displaced from said zero graduation, said marker carrying device comprises a housing enclosing both said scale and said indicator, including a transparent crystal covering and revealing said indicator and presenting said marker in position to be shifted into and out of register with said indicator by selective movements of said device.

18. An instrument for comparing work center spacing with a standard dimension as defined in claim 17, in which the said frame structure is constructed to provide separate and independent rotary bearings for the said scale, the said indicator and the said housing.

19. A center spacing test comparator, comprising in combination, an instrument framework including a hollow indicator head, a work sensing feeler mounted in movable relation to said head, a central bearing in said head, a spindle journaled in said bearing, motion transmitting mechanism connecting said spindle to said feeler, a pointer carried by said spindle, a cap-like housing mounted to swivel on said head enclosing a shallow chamber containing said pointer and having a transparent crystal revealing the latter, a dial journaled on said casing in said chamber carrying graduations disposed to be swept by said pointer, clutch connections within said chamber enabling said dial to be fixed to and freed from said housing, clutch applying and releasing means extending through said housing for manipulation externally thereof, a stud carried by said dial, independently swingable arms straddling said stud for back-setting said dial, a stop post on said indicator head also straddled by said arms in a manner to establish a normal rotary position for said dial, a spring connecting said arms together in a manner to bias both of said arms toward each other in the direction of said stud and of said post, and a marker carried by said housing in a manner to be turned therewith in a path to sweep said dial graduations and to align with said pointer in all positions of the latter relative to said dial.

References Cited in the file of this patent
UNITED STATES PATENTS

| | | |
|---|---|---|
| 1,530,607 | Young | Mar. 17, 1925 |
| 1,617,485 | Hughes | Feb. 15, 1927 |
| 1,903,322 | Ames | Apr. 4, 1933 |
| 2,388,582 | Sorensen | Nov. 6, 1945 |

FOREIGN PATENTS

| | | |
|---|---|---|
| 196,282 | Great Britain | Jan. 10, 1924 |